United States Patent [19]
Balz et al.

[11] Patent Number: 5,509,556
[45] Date of Patent: Apr. 23, 1996

[54] PROCESS FOR FORMING APERTURES IN A METALLIC SHEET

[75] Inventors: James G. Balz, Maybrook; Gregory M. Johnson, Poughkeepsie; Mark J. LaPlante, Walden; David C. Long, Wappingers Falls, all of N.Y.

[73] Assignee: International Business Machines Corporation, Armonk, N.Y.

[21] Appl. No.: 340,991

[22] Filed: Nov. 17, 1994

[51] Int. Cl.⁶ ............................ B31D 3/00; B44C 1/22; C23C 1/00
[52] U.S. Cl. ........................... 216/56; 216/65; 216/87
[58] Field of Search ........................ 216/56, 62, 65, 216/87, 100; 156/628.1, 643.1, 644.1, 345, 345 L; 219/121.68, 121.69, 121.85

[56] References Cited

U.S. PATENT DOCUMENTS

| | | | |
|---|---|---|---|
| 3,905,883 | 9/1975 | Hanazono et al. | 204/129.65 |
| 4,283,259 | 8/1981 | Melcher et al. | 204/129.3 |
| 4,622,095 | 11/1986 | Grobman et al. | 216/065 |
| 4,716,270 | 12/1987 | Granamuthu et al. | 216/65 X |
| 4,972,061 | 11/1990 | Duley et al. | 219/121.66 |
| 5,168,454 | 12/1992 | LaPlante et al. | 364/474.08 |
| 5,178,725 | 1/1993 | Takeno et al. | 216/87 |
| 5,187,148 | 2/1993 | Yoshida et al. | 505/1 |
| 5,246,530 | 9/1993 | Bugle et al. | 216/65 X |

FOREIGN PATENT DOCUMENTS 5-57473  3/1993  Japan .

OTHER PUBLICATIONS

Howrilka, et al., "Hole Cleaning", IBM Technical Disclosure Bulletin, 21, No. 3, p. 961 (Aug. 1978).
IBM Research Disclosure 26969, "High Resolution Moly Masks By Laser Etching", Sep. 1986, p. 572.

*Primary Examiner*—William Powell
*Attorney, Agent, or Firm*—Ira David Blecker

[57] ABSTRACT

A process of forming an aperture in a metallic sheet including the steps of:
  a) defining at least one feature in a sheet of metallic material;
  b) laser drilling the at least one feature but not entirely removing it from the metallic sheet, the at least one feature being partially filled by metallic material which has melted and resolidified; and then
  c) chemically etching the metallic sheet and the melted and resolidified metallic material wherein the etchant attacks and at least partially dissolves the melted and resolidified metallic material, weakening the bond of the melted and resolidified metallic material to the metallic sheet.

24 Claims, 4 Drawing Sheets

PROCESS FOR FORMING APERTURES IN A METALLIC SHEET

FIELD OF THE INVENTION

This invention relates generally to a process of forming metal sheets with apertures and more particularly to a process of forming metal masks with apertures having high aspect ratios.

BACKGROUND OF THE INVENTION

Metal sheets having apertures (such as holes, gaps, slits, slots or other openings) have many decorative and utilitarian uses. One utilitarian use is as a metal mask. Such metal masks are often used as templates for selectively exposing a material or workpiece to various manufacturing operations. For example, they may be used to screen conductive metal paste material onto a substrate to form desired features, such as conductive lines between electrical components of a circuit card. They may also be used to control the areas machined during laser ablation operations. Metal masks may also be used in photolithography operations where only certain areas of a photoresist are to be exposed. The features defined by such masks, particularly those used in integrated circuit fabrication, are often very small and must be defined with a high degree of precision. As the drive towards denser circuits continues, so does the need for masks capable of precisely defining very small and closely spaced features. Close spacing of the features, which results in less mask material between them, makes mask strength an increasingly important mask characteristic.

It should be understood that while the present invention is particularly directed to forming metal masks, the present invention is also generally applicable to the forming of apertures in metallic material for many decorative and utilitarian uses.

One way of making metal masks stronger is by increasing the thickness of the metal material used to form the mask. However, conventional methods of making masks generally lose their precision when applied to material thicknesses which are significantly greater than the smallest feature to be defined.

It would be desirable to be able to form metal masks and other metallic objects with apertures that are smaller in size than the thickness of the metallic material.

In general, it would also be desirable to have an improved process for forming apertures in metallic sheets.

In photolithography, one conventional means for forming metal masks, a photoresist is applied to a metal sheet and the photoresist is then exposed and developed to define features. Thereafter, the metal sheet with the photoresist layer is etched so as to replicate the feature defined by the photoresist in the metal sheet. However, features having dimensions significantly smaller than the thickness of the metal (i.e., an aspect ratio greater than 1) cannot be formed due to the isotropic nature of the etching portion of the process. That is, the etchant continues to remove material in the lateral direction until it has penetrated the thickness of the material. This lateral material removal also causes the rounding of inside corners of mask features, resulting in inside corners having a radii of no less than half the thickness of the mask material, thereby making square corners impossible to obtain by conventional photolithographic methods. The ability to form sharp corners on thick metallic masks is highly desirable (i.e., wire bond pads thus have more area).

LaPlante et al., U.S. Pat. No. 5,168,454, the disclosure of which is incorporated by reference herein, discloses a laser drilling technique employing a laser in the 3–10 W (average power) range which is used to machine apertures as small as 0.5 mils in a workpiece. However, this technique does not work well when applied to metal sheets having thicknesses as great as 25 mils. In the case of thick metal sheets, the material to be removed is not fully severed from the body of the metal sheet due to non-uniform penetration by the laser through the thickness of the metal and melting and resolidifying of the metallic material (i.e., rewelding) in the kerf area, thereby retaining the feature in the metal sheet. The rewelded material, and hence the feature, cannot be easily removed by mechanical operations such as punching or flexing without damaging the metal mask.

Increasing the power of the laser to the 100–200 W (average power) range would result in full penetration of thick metal sheets but also poor accuracy, poor edge definition, rounded corners, larger cut width, and possibly also warping of the metal sheets.

Howrilka et al., IBM Technical Disclosure Bulletin, 21, No. 3, p. 961 (August 1978), the disclosure of which is incorporated by reference herein, discloses the laser drilling of a blind hole in an epoxy substrate followed by etching in an acid to remove debris in the bottom of the hole. Since an epoxy substrate is drilled, there is no possibility of rewelding of the metallic feature to the adjacent metal sheet.

Melcher et al., U.S. Pat. No. 4,283,259, the disclosure of which is incorporated by reference herein, has disclosed maskless chemical and electrochemical machining wherein an energy source, such as a laser, is used to induce local heating in the workpiece while being simultaneously submerged in an etchant to speed up the chemical etching reaction and thereby preferentially remove material from the heated area. However, the thickness of the workpiece material must still be nearly as thin as the smallest dimension to be etched due to the isotropic nature of the etchant.

IBM Research Disclosure 26969, September 1986, p.572, the disclosure of which is incorporated by reference herein, discloses dry laser etching of a 1 mil wide slot in a 2 mil thick molybdenum mask. The laser, typically in the 5–10 W power range, penetrates the molybdenum by locally heating and oxidizing molybdenum to $MoO_3$ which is volatile at the elevated temperature caused by the local heating. The volatilized $MoO_3$ is carried away by a moving gas stream. Any recrystallized $MoO_3$ that is deposited on the molybdenum mask may be removed mechanically or by dissolution in a solvent. This technique, however, does not lend itself to other metals, such as stainless steel, whose gas phases occur at or above their melting points. Nor would this technique be feasible for thick metal sheets since with thick sheets, it is difficult to provide enough heat to vaporize all the metal. And, even if vaporized, the vaporized metal would redeposit on the walls adjacent to the holes being drilled. Further, for thick material, all the material is not uniformly removed, leaving bridges of material within the kerf.

Others have proposed localized atmospheres to assist or promote the laser working process.

Yoshida et al., U.S. Pat. No. 5,187,148, the disclosure of which is incorporated by reference herein, discloses a sputtering method wherein a laser causes ablation of a target, thereby causing the generation of a laser plasma. Oxygen is supplied to the laser plasma.

Dulcy et al., U.S. Pat. No. 4,972,061, the disclosure of which is incorporated by reference herein, discloses the laser irradiating of a surface to roughen it, thereby generating a surface plasma. A localized atmosphere (nitrogen or oxygen) is provided at the surface to promote a chemical change at the surface.

While the prior art is replete with methods for the working of metals with a laser, there still remains a need for a process for forming small apertures with a laser in sheets (thick or thin) of metallic material.

Accordingly, it is a purpose of the present invention to have an improved process for forming small apertures in sheets of metallic material.

It is another purpose of the present invention to have an improved process for forming small apertures in sheets of metallic: material wherein a laser is used.

It is a further purpose of the present invention to have an improved process for forming small apertures with a laser in sheets of metallic material wherein the size of the aperture can be significantly smaller in dimensions than the thickness of the metallic sheet.

It is a further purpose of the present invention to have an improved process for forming square-cornered apertures with a laser in sheets of (thick) metallic material wherein the radii of the corners of the apertures can be significantly smaller in dimension than half the thickness of the metallic sheet.

These and other purposes of the present invention will become more apparent after referring to the following description considered in conjunction with the accompanying drawings.

BRIEF SUMMARY OF THE INVENTION

The purposes of the invention have been achieved by providing a process of forming at least one aperture in a metallic sheet comprising the steps of:

a) defining at least one feature in a sheet of metallic material;

b) laser drilling the at least one feature but not entirely removing it from the metallic sheet, the at least one feature being partially filled by metallic material which has melted and resolidified; and then c) chemically etching the metallic sheet and the melted and resolidified metallic material wherein the etchant attacks and at least partially dissolves the melted and resolidified metallic material, weakening the bond of the melted and resolidified metallic material to the metallic sheet.

DETAILED DESCRIPTION OF THE INVENTION

Figure 5A:
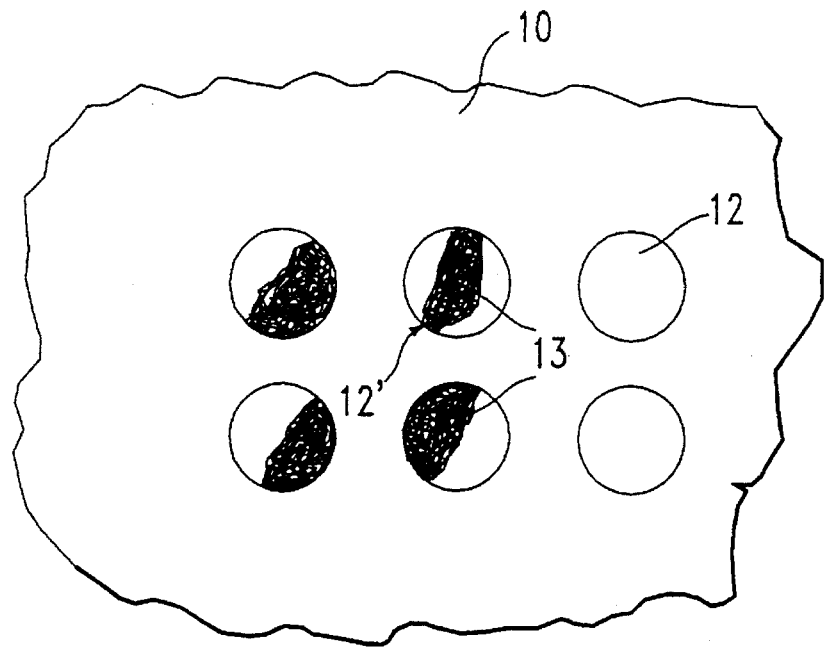
FIG. 5A is a plan view of a metallic sheet having laser drilled features partially filled with rewelded material and FIG. 5B is a plan view of the metallic sheet after immersion in a chemical etchant.
Figure 5B:
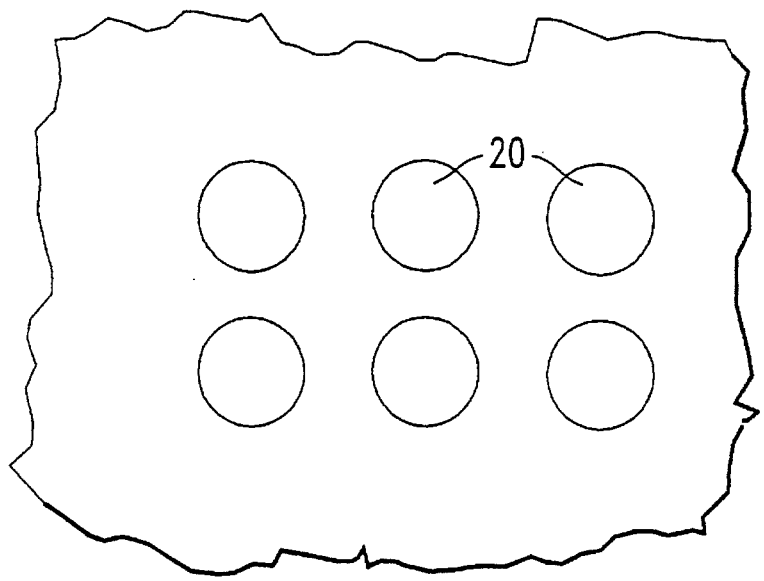

Referring to the drawings in more detail, and particularly referring to FIGS. 5, there is shown a metallic sheet 10 having at least one feature 12 defined therein. In a preferred embodiment of the invention, there will be a plurality of such features. The remaining description of the invention will be directed to the preferred embodiment wherein there are a plurality of features, although it should be understood that the invention is readily applicable to the situation where there is only a single feature. The features 12 may actually be defined by, for example, traversing the beam with an x–y table or galvo type scanner on the metallic sheet 10 but, as will be more typically the case, the features 12 will be defined by being programmed into a computer (not shown) as disclosed in the aforementioned U.S. Pat No. 5,168,454.

The features 12 may take the form of any geometric shape. As shown in FIGS. 5 (and other Figures as well) for purposes of illustration and not limitation, the features 12 are circular but they could also be square, rectangular, triangular, irregularly shaped, just to name a few.

After the features 12 have been defined, they may be drilled with a laser (not shown). Laser drilled features are noted by the reference number 12'. The particular laser is unimportant provided it is suitably chosen to penetrate the desired metallic material. Also, it is preferred that it be computer controlled. The present inventors have found that the laser apparatus disclosed in the aforementioned U.S. Pat. No. 5,168,454 is particularly well suited for the purposes of the present invention.

It should be understood that "feature", as used herein, represents the metal shape to be removed by laser drilling, resulting in the formation of an aperture. When the metallic sheet 10 is used as a screening mask, metallic paste will be forced through the aperture, replicating the feature on a substrate. In the most general aspect of the invention, the laser moves about the features until at least part of the features have been drilled. The laser will cause the drilled metallic material within the features to melt. Some of this melted material resolidifies within the features so that the feature is not entirely removed after laser drilling. As a practical matter, the smallest features will be of approximately the same size as the spot size of the laser (for example, 8 microns). It will be assumed that the features 12 in FIG. 5A are about 8 micron circles which, when drilled, will form approximately 8 micron diameter apertures. After drilling, features 12' contain some melted and resolidified metallic material 13. Then, according to the present invention, the metallic sheet 10 and melted and resolidified metallic material 13 are chemically etched in a suitable etchant. After a predetermined amount of time, the melted and resolidified metallic 13 will be attacked and dissolved by the etchant, resulting in apertures 20.

Figure 1:
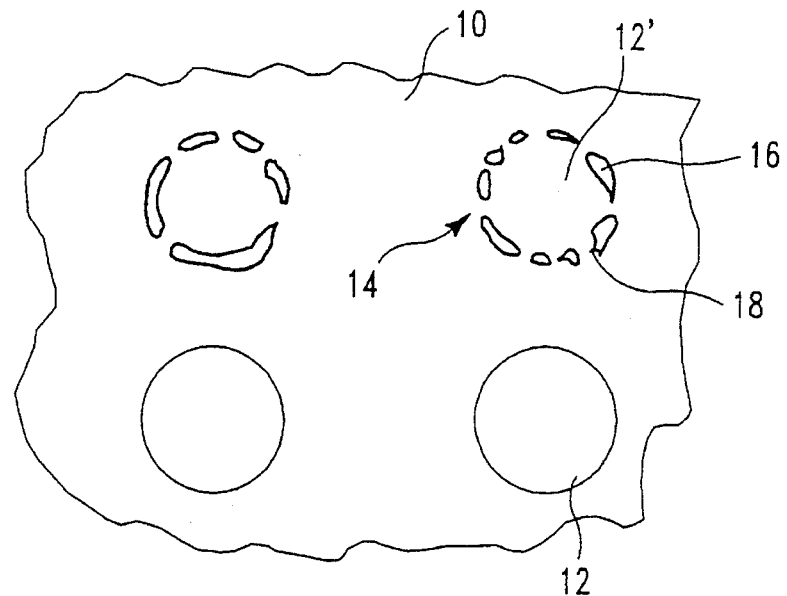
FIG. 1 is a plan view of a metallic sheet having laser drilled features.
Figure 2:
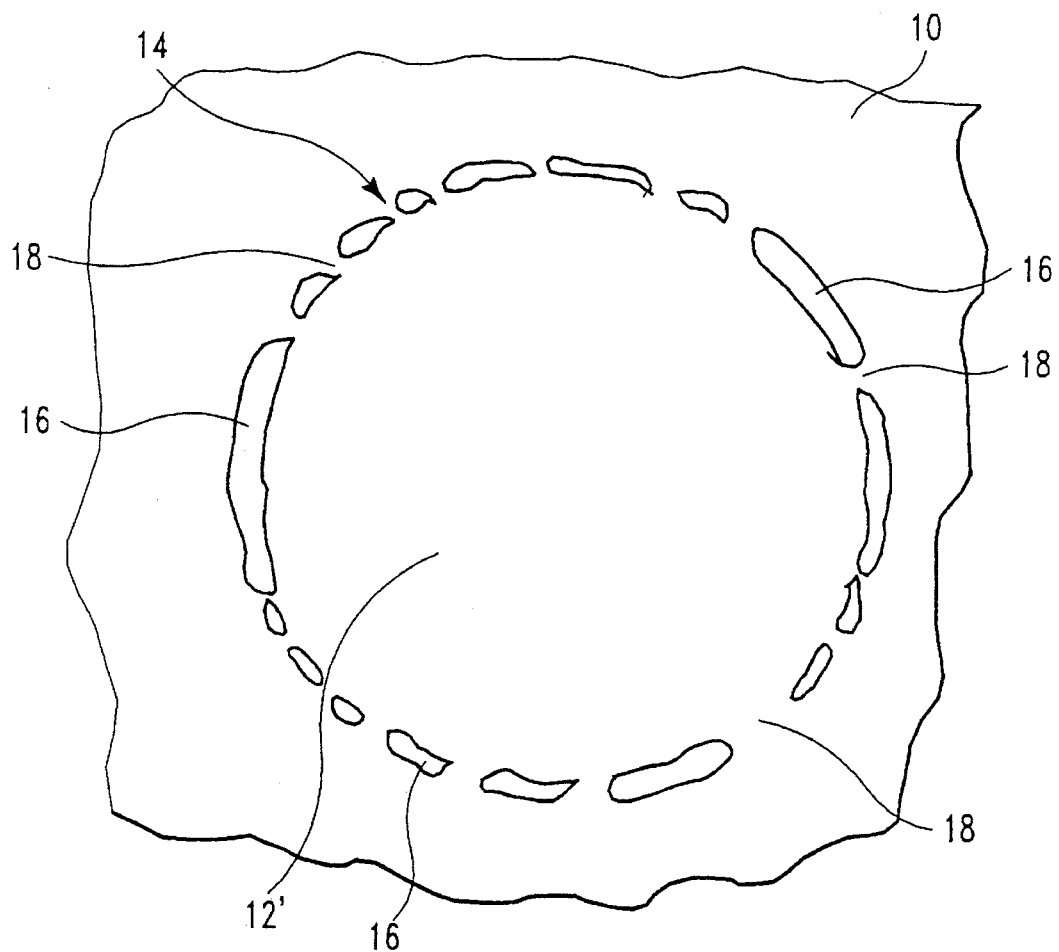
FIG. 2 is an enlarged plan view of one of the laser drilled features of FIG. 1.

As the feature size increases, it is not practical to move the laser over the entire surface of the feature 12. Rather, the laser drilling is accomplished by directing the laser around the periphery 14 of the features so as to outline the features 12' as shown in FIG. 1. The laser causes the metallic material around the periphery 14 of the features 12' to melt. However, some of this melted material resolidifies along the periphery 14 of the features 12'. As more clearly seen in FIG. 2, the periphery 14 is made of portions 18 where the metallic material has melted and resolidified so as to form a "bridge" and portions 16 where the metallic material has been completely removed. In appearance, the "rewelding" of the features 12' to the metallic sheet 10 looks very much like perforations one would see in, for example, a perforated sheet of paper. In like manner, the rewelded features 12' may be removed from the metallic sheet by mechanical manipulation such as by bending or twisting. This mechanical manipulation can, however, cause the metallic sheet 10 to become undesirably distorted.

Figure 3:
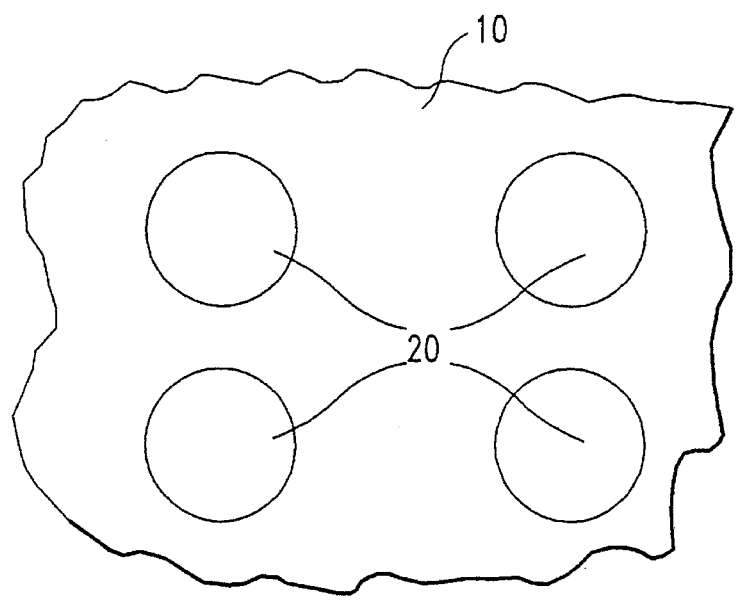
FIG. 3 is a plan view of the metallic sheet of FIG. 1 after immersion in a chemical etchant.

According to the present invention, however, the metallic sheet 10 is now chemically etched by a suitably chosen etchant. In particular, the chemical etchant attacks and at least partially dissolves the melted and resolidified material 18 at the periphery 14 of the features 12' so that the melted and resolidified material 18, which previously bonded the features 12' to the metallic sheet 10, is severely weakened with the result that the features 12' are barely held in place by the melted and resolidified material 18. Usually, a very minimal amount of pressure will cause features 12' to fall out of the metallic sheet 10. And, as is often the case, the melted and resolidified material 18 will be completely attacked and dissolved during chemical etching so that features 12' fall out of the metallic sheet 10 by themselves (or possibly with slight agitation) in the etchant. Upon removal from the etchant, or after slight pressure to remove any remaining features 12', the resultant product is metallic sheet 10 having apertures 20 as shown in FIG. 3.

For thicker metallic sheets where a corner is desired with a radii of less than half the thickness of the material, the laser beam is directed about the periphery of the feature and, by virtue of its small spot size, creates a corner with a radii as small as 4 microns. After drilling, the melted and resolidified metallic material is chemically etched as above, resulting in apertures with corners having radii not significantly larger than 4 microns.

It should be noted that the step of chemically etching may cause the metallic sheet 10 to be attacked as well as the melted and resolidified material 18. This effect will be minimal as the etchant will typically preferentially attack the melted and resolidified material 18, which is essentially porous, due to its greater surface area.

The resulting article may have many uses, both utilitarian and decorative. However, a preferred use of the present invention is as a mask, either for screening metallic pastes or to shield the underlying substrate during laser ablation or lithography.

Further, since the step of chemical etching occurs for a very short amount of time, features may be produced which have an aspect ratio of 1 or greater. The aspect ratio can be defined as the depth of the feature divided by its width.

The material of the metallic sheet may be any metallic material that is susceptible to laser drilling such as molybdenum, steels, stainless steel, titanium, nickel, aluminum, copper, brass, etc. The most preferred metallic materials are molybdenum and stainless steel.

In a preferred embodiment of the invention, the laser drilling is done in an oxygen-containing atmosphere so that oxides will form in the metallic material 18 that has undergone melting and resolidifying. The entire laser drilling apparatus need not be encapsulated with the oxygen-containing atmosphere to be effective. Rather, all that is necessary is to have a localized oxygen-containing atmosphere at the feature that is being laser drilled. This may simply be accomplished by directing a flow of the oxygen-containing atmosphere at the feature that is being laser drilled. The oxygen-containing atmosphere may simply be air or alternatively oxygen. It is believed that the chemical etchant can be tailored to preferentially attack the oxides that form as the melted and resolidified material 18 so that the metallic sheet 10 itself will not be attacked to any appreciable extent. For example, in the case of a molybdenum metallic sheet 10, the oxide that forms is $MoO_3$. The metallic sheet 10 with laser drilled feature 12' may then be etched with a 50/50 mixture of 30% hydrogen peroxide and ammonium hydroxide (full strength) which attacks and dissolves the melted and resolidified material 18 (thereby causing the feature 12' to fall out of the metallic sheet 10) but does not attack the molybdenum metallic sheet 10 to any appreciable extent.

Figure 4A:
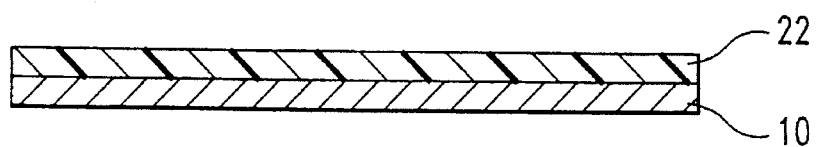
FIG. 4A is a cross-sectional view of a metallic sheet having a coating thereon.
Figure 4B:
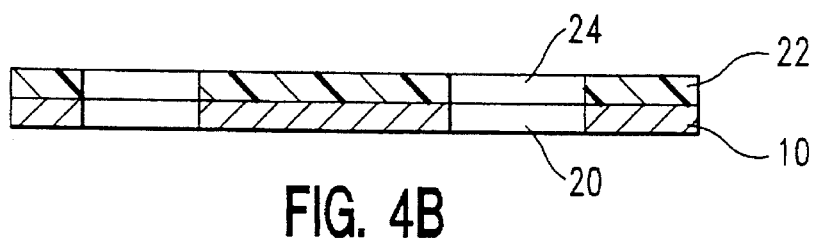
FIG. 4B is a cross-sectional view of the metallic sheet/coating of FIG. 4A after being laser drilled.
Figure 4C:
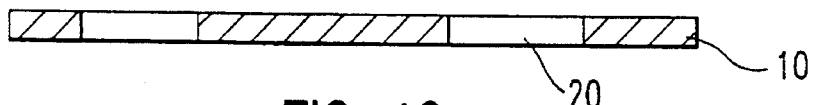
FIG. 4C is a cross-sectional view of the resulting apertured metallic sheet.

As noted previously, the metallic sheet 10 may be minimally attacked during the chemical etching step. Referring now to FIGS. 4A, 4B and 4C, there is shown an alternative embodiment of the present invention wherein the metallic sheet 10 is protected during the step of chemically etching by a protective film. The protective film 22 is applied to the metallic sheet 10 as shown in FIG. 4A. The protective film 22 may be applied to only one side of the metallic sheet 10 for partial protection, as shown in FIG. 4A, or may be applied to both sides (not shown) of the metallic sheet 10 for nearly complete protection. Thereafter, the protective film 22 and metallic sheet material 10 are simultaneously processed with a laser (not shown) and subsequently etched to form apertures 24 in the protective film and apertures 20 in the metallic sheet 10. The resulting structure is shown in FIG. 4B. Finally, the protective film 22 is stripped by a suitable solvent, leaving the metallic sheet 10 with apertures 20 as shown in FIG. 4C.

The protective film 22 may be any material that is resistant to the chemical etchant, preferably can be drilled with the same laser that is used to drill the metallic sheet 10, and can be easily stripped from the metallic sheet after etching. Such protective films 22 thus may include polyimides, photoresists, photosensitive polyimides,, epoxies, silicon coatings, enamels, lacquers and other similar coatings. Alternatively, other materials, such as gold, aluminum, anodized aluminum, chromium, glasses, etc., which are non-reactive (or at least not as reactive) to the chemical etchant may also be used.

Figure 6A:
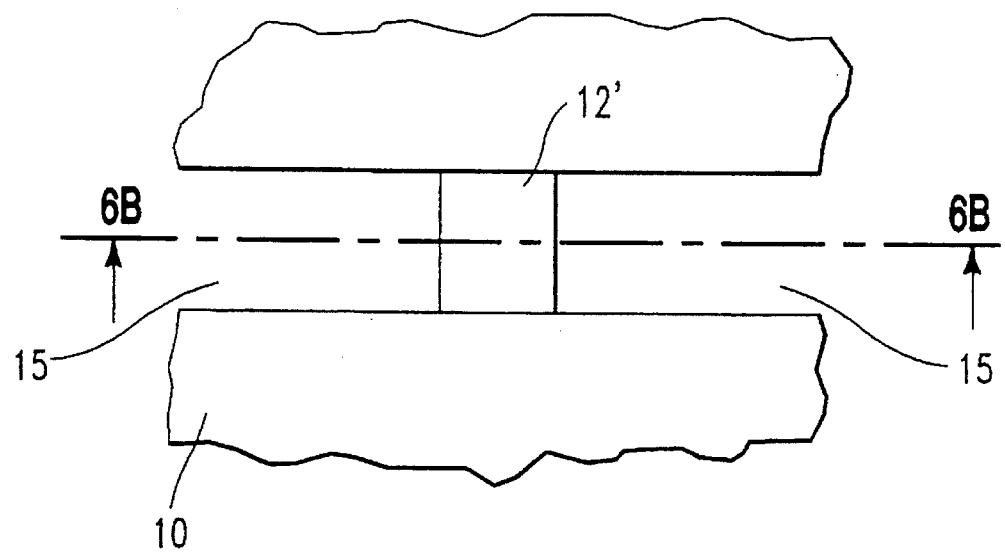
FIG. 6A is a plan view of a metallic sheet having a laser drilled feature.
Figure 6B:
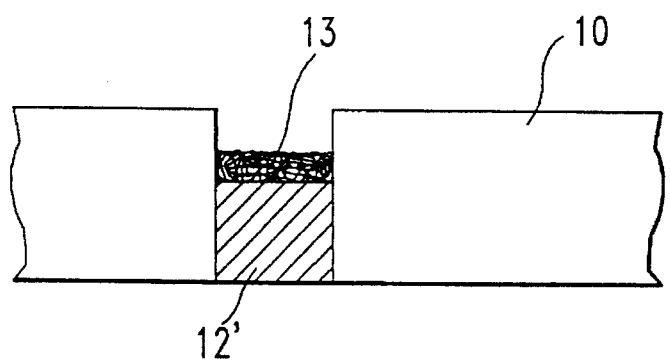
FIG. 6B is a cross-section view of FIG. 6A, showing a partially laser drilled feature and rewelded material.
Figure 6C:
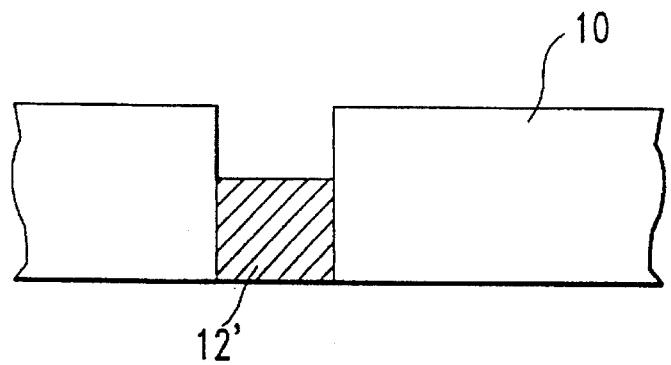
FIG. 6C is a view of FIG. 6B after immersion in a chemical etchant.

A further variation of the invention is shown in FIG. 6. There, a laser (not shown) is utilized to drill partially through a metallic sheet 10. As shown in FIG. 6A, metallic sheet 10 has features 12' which have been partially drilled by a laser. Areas 15 are open. Referring now to FIG. 6B, there is melted and resolidified metallic material 13 sitting on the undrilled portion of feature 12'. After immersion in a suitable chemical etchant, melted and resolidified metallic material 13 is removed, leaving only partially laser drilled feature 12', as best seen in FIG. 6C. This aspect of the invention may have particular applicability to screening masks where open areas are required for screening paste to form lines. Features 12' are tabs which provide structural integrity to the open areas of the screening mask. This aspect of the invention is also generally applicable to forming metallic sheets with blind holes or other apertures which do not completely perforate the metallic sheet.

The purposes and advantages of the present invention will become more apparent after referring to the following Example.

EXAMPLE

The present invention was utilized to form 0.0020 inch vias in a 0.0100 inch thick sheet of stainless steel. A Q-switched Nd:YAG laser was operated according to the teachings of the aforementioned U.S. Pat. No. 5,168,454 at a power of 1.25 watts at 1 khz with a spot size of 8 microns to outline a circular feature having a diameter of 0.0018 inches. The drilled stainless steel sheet was then placed in an etchant bath and ultrasonically agitated at 40 degrees C. for about one hour. The etchant consisted of, in weight percent, 77% water, 20% nitric acid and 3% hydrofluoric acid. After removal from the bath, the features were completely removed, leaving apertures (vias) of 0.002 inch diameter. The post-etch thickness of the stainless steel sheet was 0.0098 inches.

Thus, vias having an aspect ratio of about 5 were formed in a stainless steel sheet. The stainless steel sheet was minimally affected by the etchant.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A process of forming an aperture in a metallic sheet comprising the steps of:
   a) defining at least one feature in a sheet of metallic material;
   b) laser drilling the at least one feature but not entirely removing it from the metallic sheet, the at least one feature being partially filled by metallic material which has melted and resolidified; and then
   c) chemically etching the metallic sheet and the melted and resolidified metallic material wherein the etchant attacks and at least partially dissolves the melted and resolidified metallic material, weakening the bond of the melted and resolidified metallic material to the metallic sheet.

2. The process of claim 1 wherein the laser drilling is performed in an oxygen-containing atmosphere so that oxides are formed in the metallic material that has melted and resolidified.

3. The process of claim 2 wherein the chemical etchant is chosen so that it preferentially attacks the oxides.

4. The process of claim 1 wherein the metallic sheet is stainless steel.

5. The process of claim 1 wherein the metallic sheet is molybdenum.

6. The process of claim 1 wherein the defining step a) is preceded by the step of coating at least one surface of the metallic sheet with a protective film.

7. The process of claim 1 wherein the metallic sheet is a metal mask.

8. The process of claim 1 wherein in the step of chemically etching, all of the melted and resolidified metallic material is attacked and removed from the metallic sheet, thereby leaving an aperture in the metal sheet.

9. The process of claim 8 wherein the aperture does not completely perforate the metallic sheet.

10. The process of claim 8 wherein the aperture has an aspect ratio of greater than 1.

11. The process of claim 1 wherein there are a plurality of features and in the step c) of chemically etching, all of the melted and resolidified metallic material is attacked and removed for at least some of the features, thereby leaving a plurality of apertures in the metal sheet.

12. The process of claim 11 wherein the apertures do not completely perforate the metallic sheet.

13. A process of forming an aperture in a metallic sheet comprising the steps of:
   a) defining at least one feature in a sheet of metallic material;
   b) laser drilling around the periphery of the at least one feature so as to outline the at least one feature but not remove it from the metallic sheet, the at least one feature being partially bonded to the metallic sheet by metallic material which has melted and resolidified; and then
   c) chemically etching the metallic sheet and the melted and resolidified metallic material wherein the etchant attacks and at least partially dissolves the melted and resolidified metallic material around the feature, weakening the bond of the melted and resolidified metallic material to the metallic sheet.

14. The process of claim 13 wherein the laser drilling is performed in an oxygen-containing atmosphere so that oxides are formed in the metallic material that has melted and resolidified.

15. The process of claim 14 wherein the chemical etchant is chosen so that it preferentially attacks the oxides.

16. The process of claim 13 wherein the metallic sheet is stainless steel.

17. The process of claim 13 wherein the metallic sheet is molybdenum.

18. The process of claim 13 wherein the defining step a) is preceded by the step of coating at least one surface of the metallic sheet with a protective film.

19. The process of claim 13 wherein the metallic sheet is a metal mask.

20. The process of claim 13 wherein in the step of chemically etching, all of the melted and resolidified metallic material is attacked so that the at least one feature is removed from the metallic sheet, thereby leaving an aperture in the metallic sheet.

21. The process of claim 20 wherein the aperture does not completely perforate the metallic sheet.

22. The process of claim 20 wherein the aperture has an aspect ratio of greater than 1.

23. The process of claim 13 wherein there are a plurality of features and in the step c) of chemically etching, all of the melted and resolidified metallic material is attacked for at least some of the features so that at least some of the features are removed from the metallic sheet, thereby leaving a plurality of apertures in the metal sheet.

24. The process of claim 23 wherein the apertures do not completely perforate the metallic sheet.

* * * * *